(12) United States Patent
Chavan et al.

(10) Patent No.: US 6,566,849 B1
(45) Date of Patent: May 20, 2003

(54) NON-LINEAR TEMPERATURE COMPENSATION CIRCUIT

(75) Inventors: Abhijeet V. Chavan, Carmel, IN (US); Gregory J. Manlove, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/075,130

(22) Filed: Feb. 12, 2002

(51) Int. Cl.$^7$ ................................................ G05F 3/04
(52) U.S. Cl. ...................................... 323/312; 323/907
(58) Field of Search ............................... 323/312, 314, 323/907

(56) References Cited

U.S. PATENT DOCUMENTS

| | | | | |
|---|---|---|---|---|
| 4,090,124 A | * | 5/1978 | Kroner et al. ............... | 323/314 |
| 4,317,184 A | * | 2/1982 | Leszczynski ................. | 367/13 |
| 4,362,984 A | * | 12/1982 | Holland ....................... | 323/313 |
| 5,068,595 A | * | 11/1991 | Kearney et al. ............. | 323/316 |
| 5,608,347 A | | 3/1997 | Kearney ...................... | 327/512 |
| 5,619,122 A | | 4/1997 | Kearney et al. ............. | 323/312 |
| 5,783,936 A | * | 7/1998 | Girard et al. ................ | 323/315 |
| 6,118,264 A | * | 9/2000 | Capici ......................... | 323/316 |
| 6,177,788 B1 | * | 1/2001 | Narendra et al. ............ | 323/315 |
| 6,522,117 B1 | * | 2/2003 | Young et al. ................ | 323/315 |

* cited by examiner

Primary Examiner—Adolf Denske Berhane
(74) Attorney, Agent, or Firm—Jimmy L. Funke

(57) ABSTRACT

A non-linear temperature compensation circuit (10) is provided for generating at least dual-slope characteristics responsive to changes in operating temperature of the compensation circuit. The compensation circuit includes a temperature dependent current generator circuit (11) for generating at least one output (14) substantially proportional to changes in the temperature of the circuit, a current-based dual-slope drift generator (12) for generating a current proportional to absolute temperature, and a summing means (14) for summing both current outputs and generating a compensation drift voltage. The temperature dependent current generator includes a sub-circuit having a first current generator that generates a current (I2) that is relatively independent of temperature, and a second current generator that generates a second current (I3) that decreases with increases in temperature. The two currents are compared and a non-zero output current (I4) is generated if the second current (I3) exceeds the first current (I2), which output current (I4) decreases with increases in temperature.

18 Claims, 8 Drawing Sheets

NON-LINEAR TEMPERATURE COMPENSATION CIRCUIT

TECHNICAL FIELD

The present invention relates to temperature compensation for use in connection with thermal sensors, such as air flow meters in emissions control.

BACKGROUND OF THE INVENTION

The use of bi-directional air flow meters in engines is well known and often required for control of emissions. These air flow meters measure the mass of the air inducted into the engine using a flow sensor. A known flow sensor can include a thermally isolated Wheatstone bridge, such as that shown in FIG. 2, which is balanced under a no air-flow condition. When airflow exists, resistors placed downstream of the flow receive more heat from their respective heaters than the resistors placed upstream of the flow. Each resistor has a certain temperature coefficient at which its resistance changes. Thus, with the downstream resistors receiving more heat, their respective resistance will change sooner than the upstream resistors and the Wheatstone bridge then becomes unbalanced. The magnitude of the unbalanced voltage is proportional to the airflow through the meter system.

While the use of resistors provides all inexpensive and easily accessible method of measuring airflow, such resistors, or thermal devices, have an inherent thermal drift. This thermal drift can cause the measurement device to exhibit certain non-linear characteristics. Such iron-linear characteristics call include multiple breakpoints where the drift characteristics change polarity, or exhibiting a positive slope characteristic up to one temperature, and then a negative slope thereafter, or vice versa. Certain of these non-linear characteristics are depicted in the exemplary graphs shown in FIGS. 1A–D. With these non-linear characteristics, the calibration and compensation of the thermal devices or sensors becomes very difficult.

One prior approach to linearize these non-linear characteristics of the thermal devices, or resistors, has been to provide a circuit with two slopes in the compensated voltage characteristics. One system of this type is described in U.S. Pat. No. 5,619,122 which issued on Apr. 8, 1997, to the assignee of the present invention. Also included in this prior approach has been a method of obtaining a change in slope which is dependent on temperature, i.e. dual-slope compensation. However, this prior approach requires calibration and trimming at two or more different temperatures, thereby increasing the cost of the overall sensor through the necessary calibration time for the circuit.

SUMMARY OF THE INVENTION

It is an object of the present invention to provide a non-linear temperature compensation circuit which is responsive to changes in operating temperature of the compensation circuit.

The present invention preferably provides a non-linear temperature compensation circuit for generating at least dual-slope characteristics responsive to changes in operating temperature of the compensation circuit. The inventive circuit can include a temperature dependent current generator circuit 2 for generating at least one output substantially proportional to changes in the temperature of the circuit from a first temperature. The non-linear temperature compensation circuit can also preferably include a current-based dual-slope drift generator for generating a current proportional to an absolute temperature. The novel circuit can further include summing means for summing the output generated by the temperature dependent current generator circuit and the current generated by the current-based dual-slope generator. In certain embodiments, this sum is used to generate the required voltage drift characteristic that can be applied to the sensor output.

The present invention is advantageous in that the cost to produce and calibrate is reduced due, in part, to the reduction in calibration time required. A further advantage of the inventive non-linear temperature compensation circuit is that the slope change points, or break points, can be known and do not require trimming for setting the slope change point.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates an embodiment of the invention and such exemplification is not to be construed as limiting the scope of the invention in any manner.

DESCRIPTION OF THE PREFERRED EMBODIMENTS

Figure 1A:
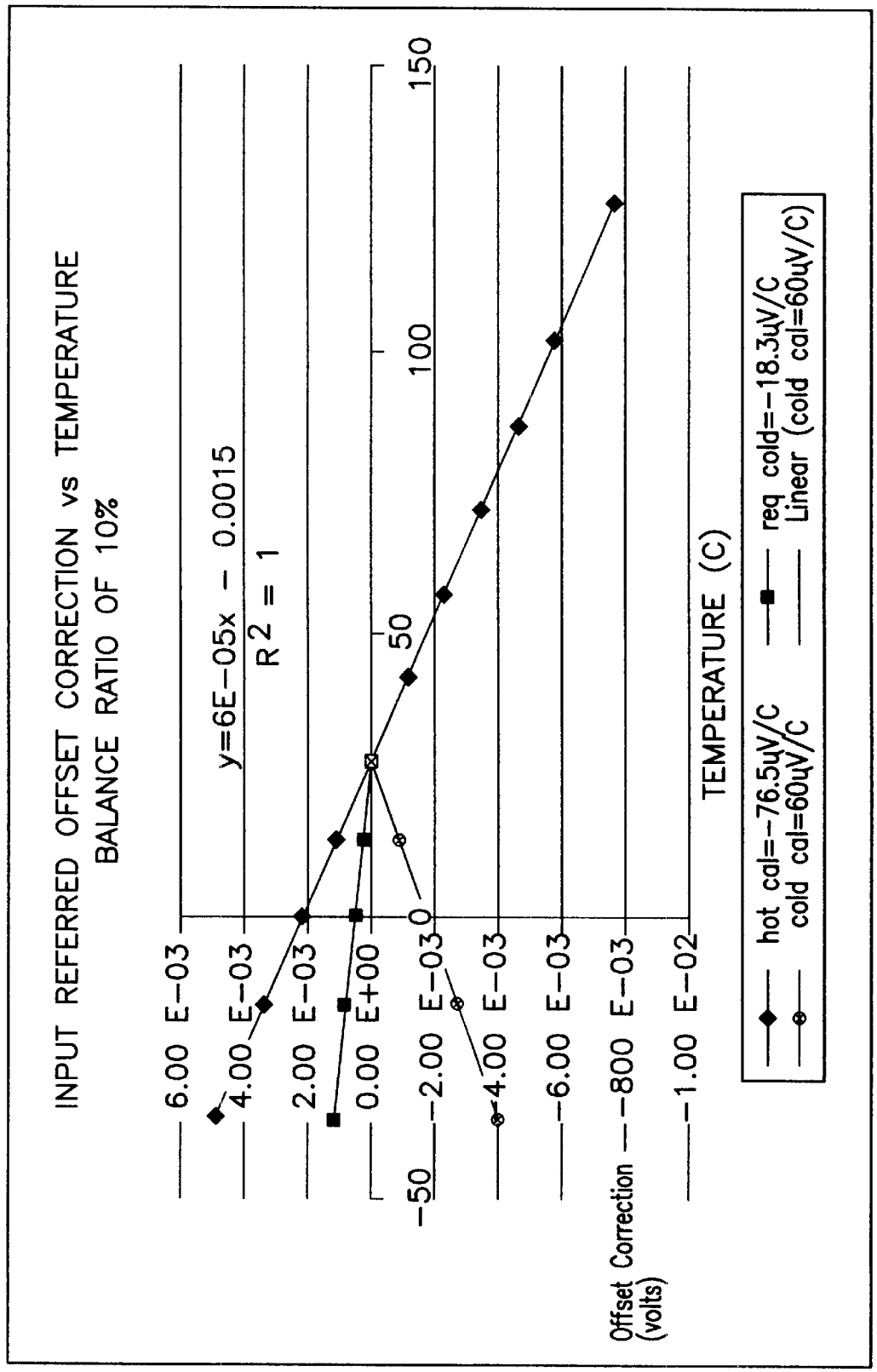
FIGS. 1A–1D are compilations of graphs depicting the relationship between offset correction in volts and temperature in degrees Celsius, showing the non-linear characteristics of the resistors at certain temperatures.
Figure 1B:
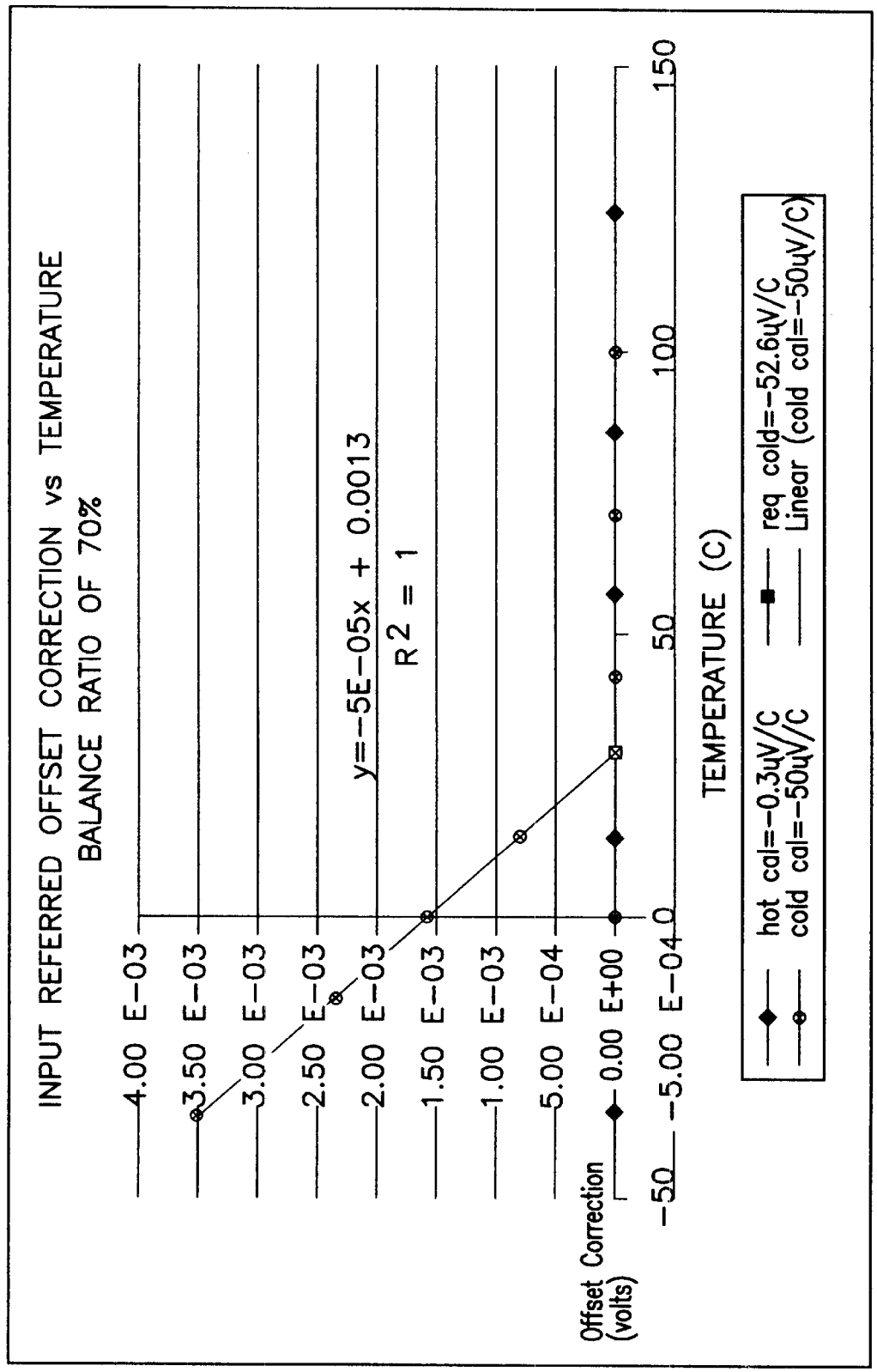
Figure 1C:
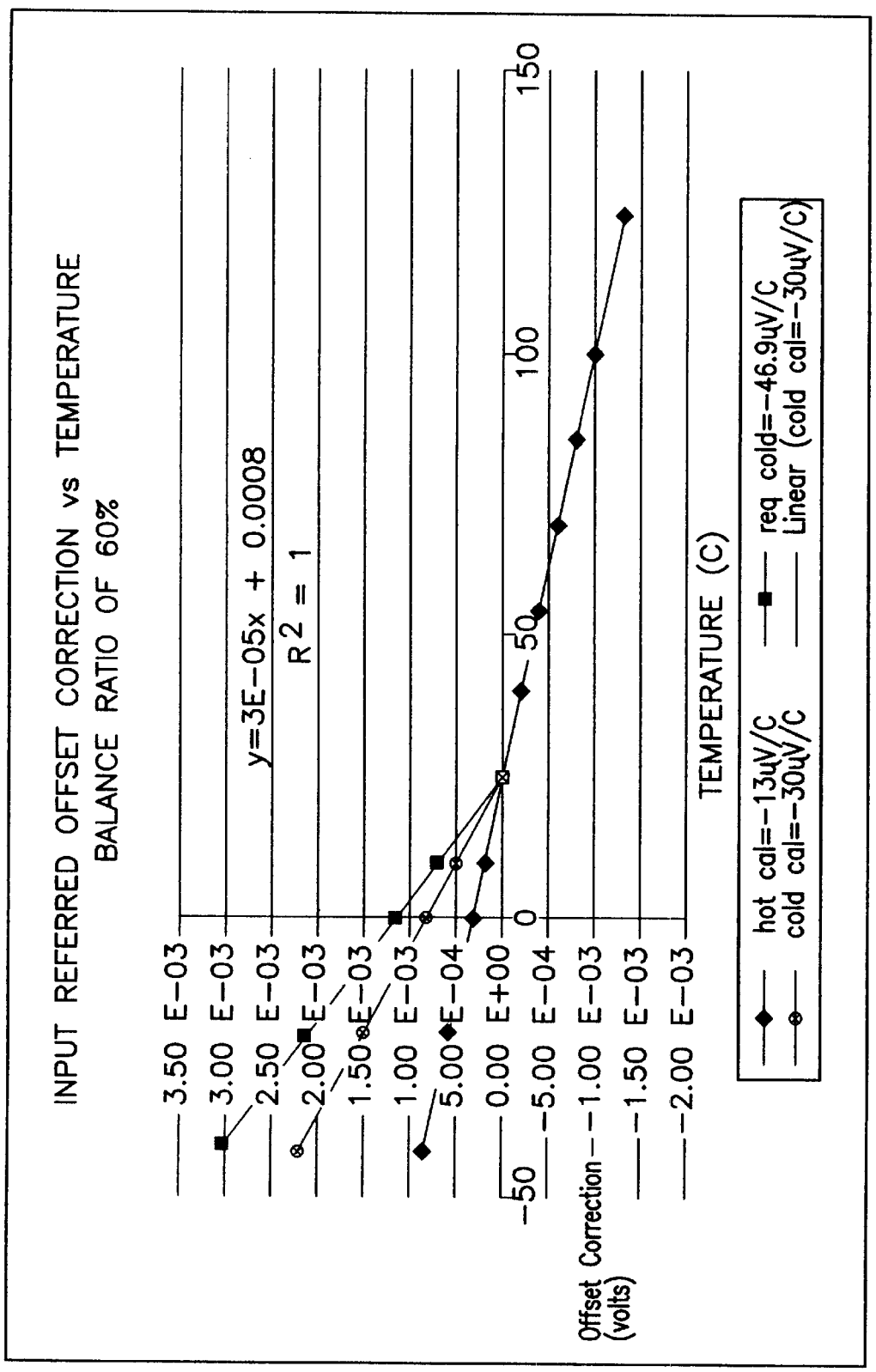
Figure 1D:
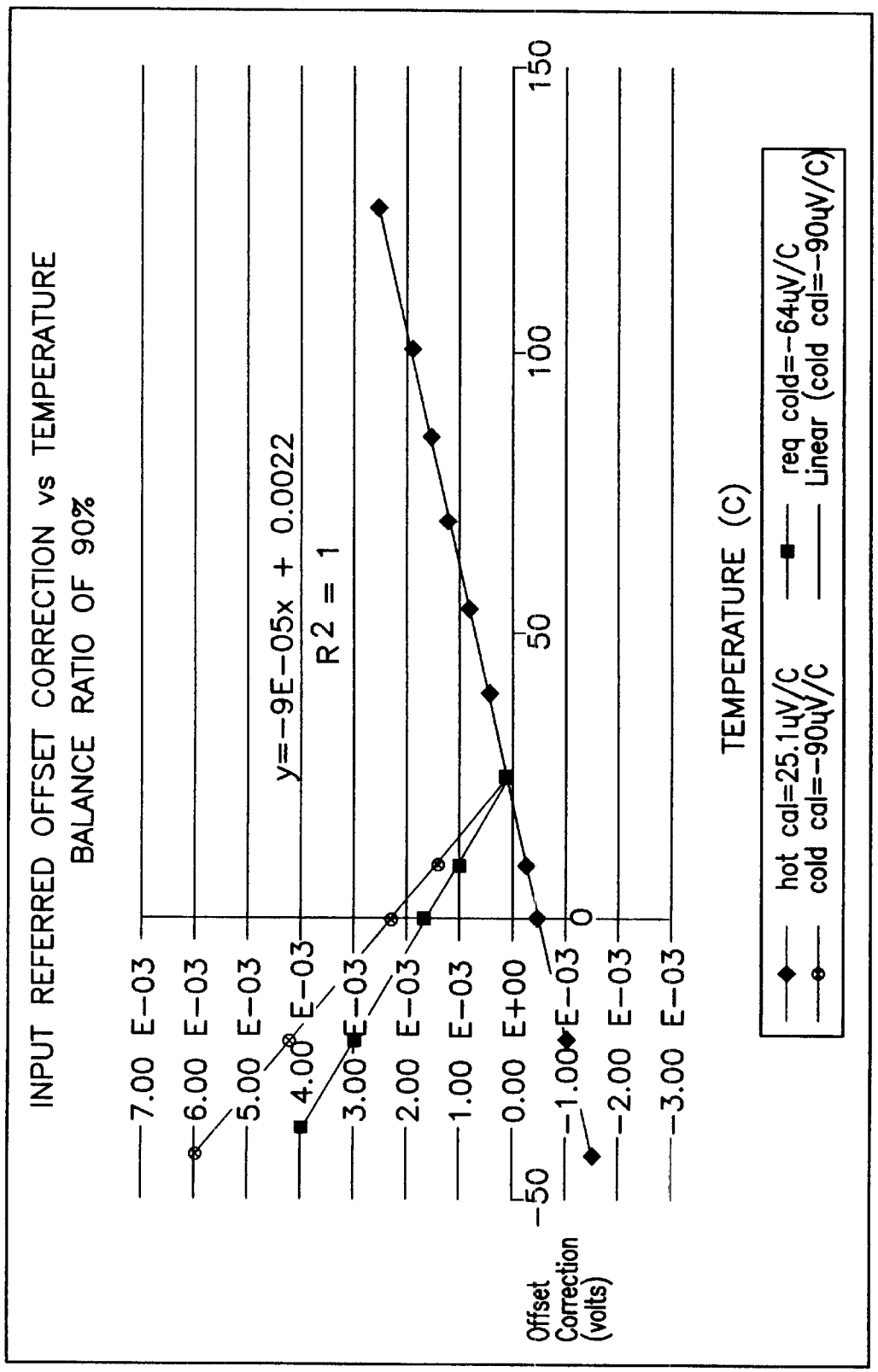
Figure 2:
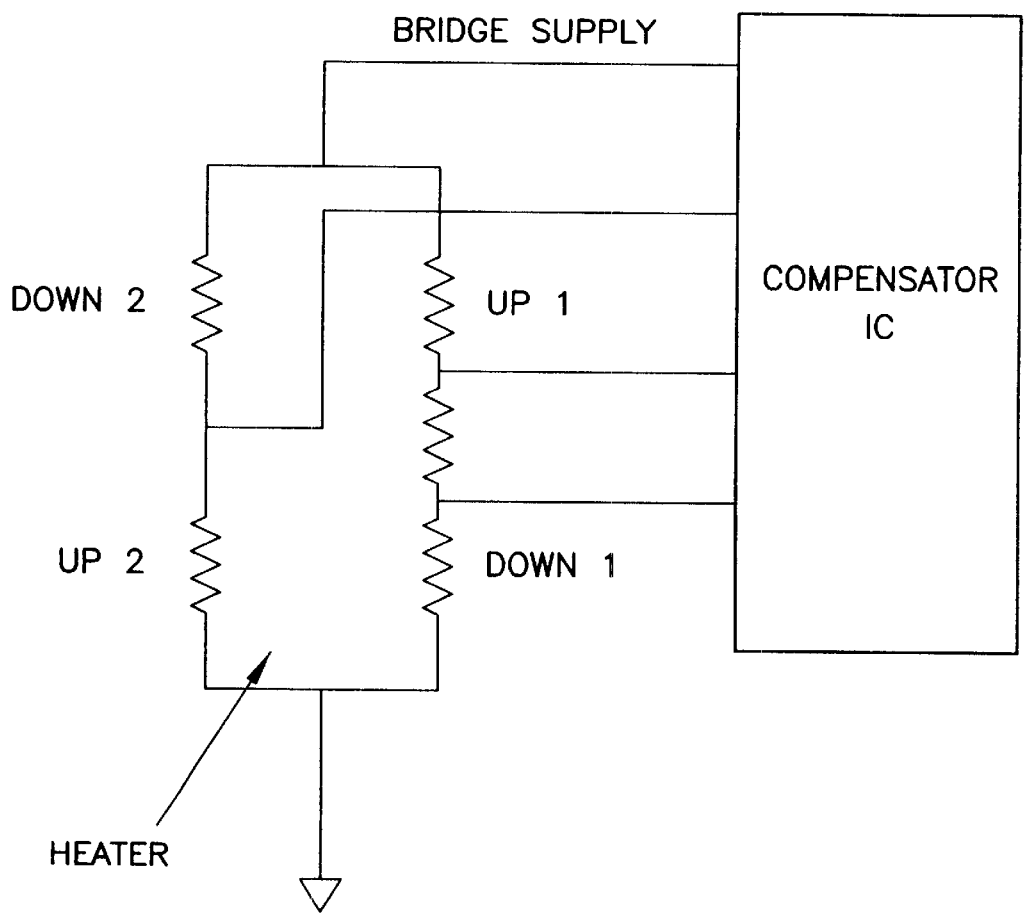
FIG. 2 is a schematic diagram of a known flow meter which may incorporate the present invention therein.
Figure 3:
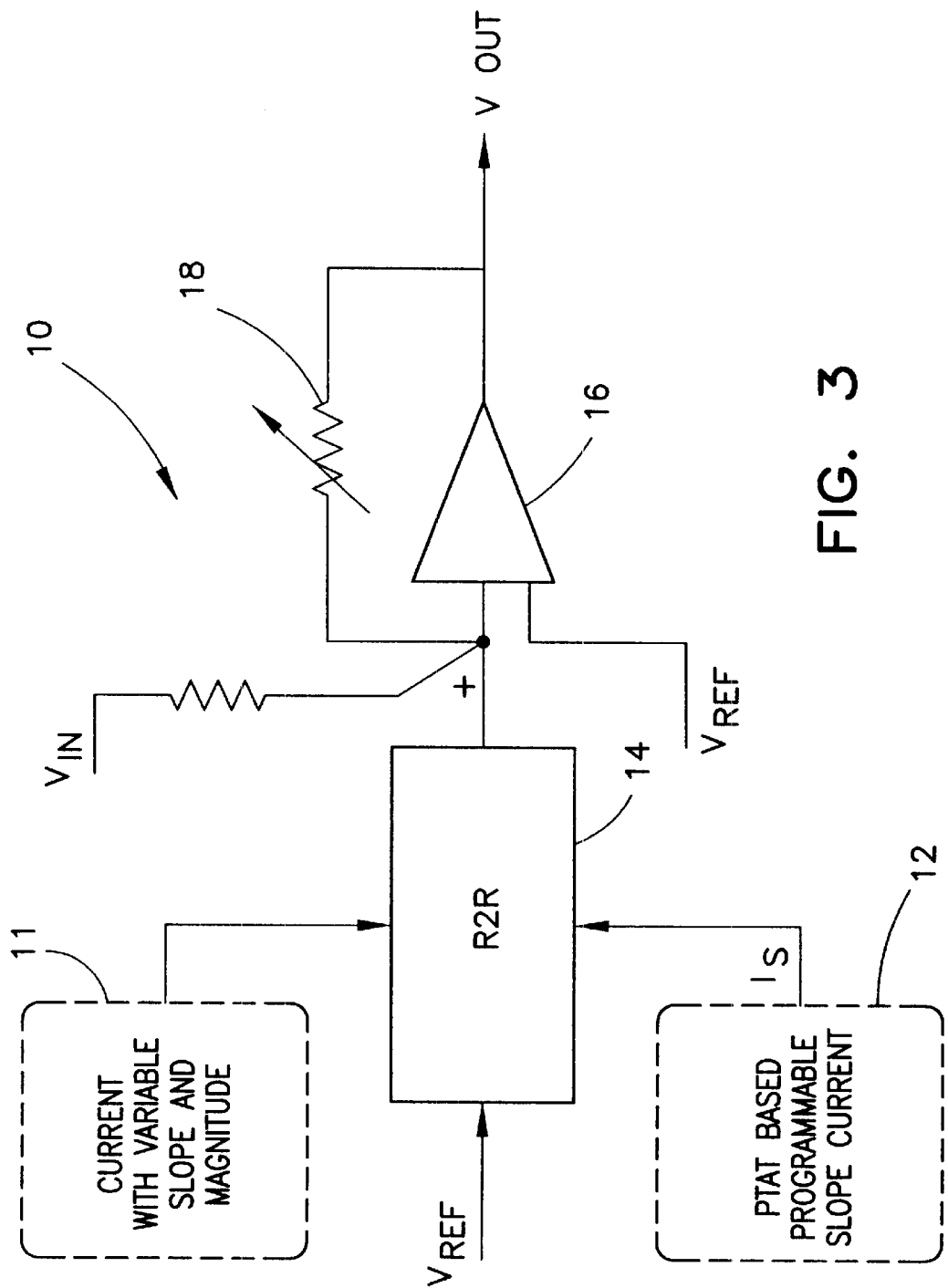
FIG. 3 is a schematic diagram of a circuit for an interface, compensation, and calibration ASIC in accordance with the present invention.
Figure 4:
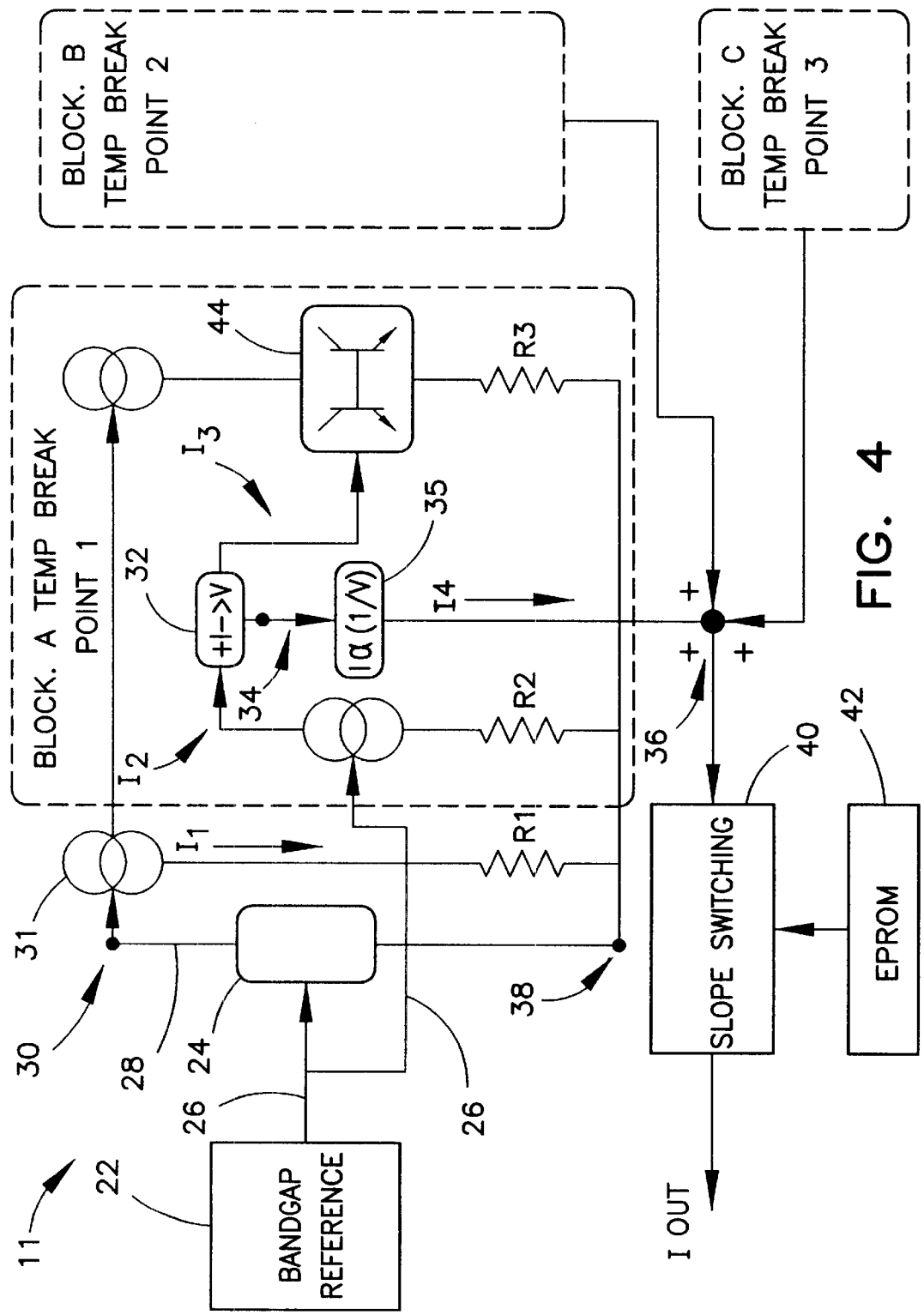
FIG. 4 is a detailed schematic diagram of the temperature dependent variable slop bi-directional current generator of the present invention.

Referring now to FIGS. 3 and 4, a circuit 10 is depicted. This circuit can be implemented as part of an interface, compensation, and calibration ASIC for a sensor, or most preferably for a bi-directional air flow meter of the type shown in FIG. 2. In the preferred embodiment, the circuit 10 can include two portions: a temperature dependent variable slope bi-directional current generator 11 (shown in more detail in FIG. 4); and a proportional-to-absolute-temperature (PTAT) current-based dual-slope drift generator 12. The PTAT drift generator produces a current that is proportional to the operating temperature of the circuit, and ultimately the sensor or meter.

The currents derived from generators 11 and 12 are summed at a summing means 14, which preferably includes an R2R ladder network. Such ladder networks are known in the art and can be constructed as the exemplary network shown in FIG. 5. The summed currents are then fed through an operational amplifier 16 which incorporates a variable resistor 18 to obtain the required voltage drift characteristics for circuit 10. The summing means 14 receives the uncompensated voltage signal $V_{IN}$ from the sensor and applies the summed current to generate a compensated output voltage V<sub>OUT</sub>. This output voltage V<sub>OUT</sub> is temperature compensated and adjusted according to the appropriate break points for the system to provide an accurate indication of the measured quantity, such as airflow.

With reference to FIG. 4, the temperature dependent variable slope bi-directional currents generator 11 is shown as having several points at which different currents are generated. A band gap voltage generator 22 produces a reference voltage 26 which can be mathematically represented by the formula:

$$V_{REF} = V_{BE} + KV_T$$

This reference voltage V<sub>REF</sub> is fed into block 24 and current generator 25. At block 24, the V<sub>BE</sub> term is subtracted, thereby leaving voltage 28 proportional to a constant and a temperature dependent voltage, or $KV_T$. This is the same voltage at node 30 and at current generator 31. This voltage $KV_T$ generates a current I1 that is dependent upon temperature in a manner similar to $KV_T$, and that is proportional to the resistance value of resistor R1.

The uncompensated reference voltage V<sub>REF</sub> is fed into generator 25, which generates current I2 through resistor R2. This current I2 is relatively independent of temperature, through its constant ($K_1$) multiplied by a temperature dependent voltage term, and can be represented mathematically by:

$$\frac{(V_{BE} + K_1 V_T)}{R2}$$

The current I1 is also ratioed and mirroed to block 44, which generates a current I3. This current I3 is inversely proportional to temperature change through the subtraction of its constant ($K_2$) multiplied by the temperature dependent voltage term. In other words, the current I3 decreases as the temperature increases. This relationship can be represented by the formula:

$$\frac{(V_{BE} - K_2 V_T)}{R3}$$

The $K_2$ term consist of a logarithm of the ratio of two currents internal to block 44. The ratio is such that it is always <1, which results in the log term evaluating to a small value. Thus, $V_{BE}$ is the dominant term in the above equation resulting in a current I3 that is inversely proportional to the temperature.

At block 32, current I2 and current I3 are summed to create a corresponding voltage V at node 34. This voltage V is applied to a threshold current generator 35. This current generator is operable to generate a current I4 that is zero if the voltage V is above a pre-determined threshold value. In a specific embodiment, if (I3−I2)<0, then the voltage V is set above the threshold voltage, which is 7.3 volts in the specific embodiment. On the other hand, If (I3−I2)>0, then the voltage V falls below the threshold, or is less than 7.3 volts.

Thus, as long as current I2 is greater than current I3, voltage V at node 34 remains above the threshold value (7.3 volts in the specific example). When voltage V is above the threshold, the current generator 35 yields a zero current. However, when current I3 becomes greater than I2, voltage V falls below the threshold value and the current generator 35 produces a current I4 that is non-zero. In addition, this non-zero current I4 is driven by the voltage V which is dependent on current I3, so that the current I4 increases in magnitude as the temperature decreases.

The point at which current I3 becomes greater than the current I2 can be determined by manipulating the ratios of resistance values for resistors R2 and R3. This overall scheme allows establishment of the break in the current drift at a pre-determined temperature.

The relationship between the currents I2, I3 and I4 for the most preferred embodiment can be summarized as follows: if $$\left[ \frac{(V_{BE} + K_1 V_T)}{R2} - \frac{(V_{BE} - K_2 V_T)}{R2} \right] > 0,$$

then current I4>0; and if $$\left[ \frac{(V_{BE} + K_1 V_T)}{R2} - \frac{(V_{BE} - K_2 V_T)}{R2} \right] < 0,$$

then current I4=0.

The current I4 is generated from a voltage V which is dependent on I3 and I2. As can be seen, if resistors R2 and R3 are carefully matched to achieve similar temperature coefficients, then the temperature dependence of the $V_{BE}$ terms drops out. In the preferred embodiment, the coefficient K2 is small so that the term $K_2 V_T$ can be ignored to a first order. Through manipulation of the equations, voltage V at node 34 can ultimately be mathematically represented by the following proportionality:

$$V \propto K_1 V_T$$

Thus, the voltage V is dependent only on the constant K1 and the thermal voltage, with the resultant crossover point of the two currents being dependent on the well-known formula for thermal voltage, $V_T = KT/q$, where $V_T$ is the thermal voltage and K is the Boltzman's constant multiplied by the operating temperature and divided by charge.

The set-up of the circuit 10 of the preferred embodiment of the present invention allows the untrimmed band gap reference to be used to produce a non-linear voltage characteristic to within 2% to 3% accuracy. Thus, the scheme and the careful selection of resistors R2 and R3 provide a break in the current drift at a pre-select temperature.

Although only one block, Block A, of temperature dependent variable slope bi-directional current generator 11 has been described, additional breakpoints may be similarly achieved by using the structure of Block A in the other blocks in the circuit, such as Blocks B and C shown in FIG. 4. Like the circuit of Block A, selection of the corresponding resistors R2 and R3 in the other blocks can control the specific breakpoint. The other Blocks B and C may thus be used to provide different breakpoints and different current sinking magnitudes within the temperature dependent variable slope bi-directional current generator 11. However, all currents from each separate Block A, B, and C are summed at node 36 to obtain a single current which is capable of changing value at various different temperatures.

Figure 5:
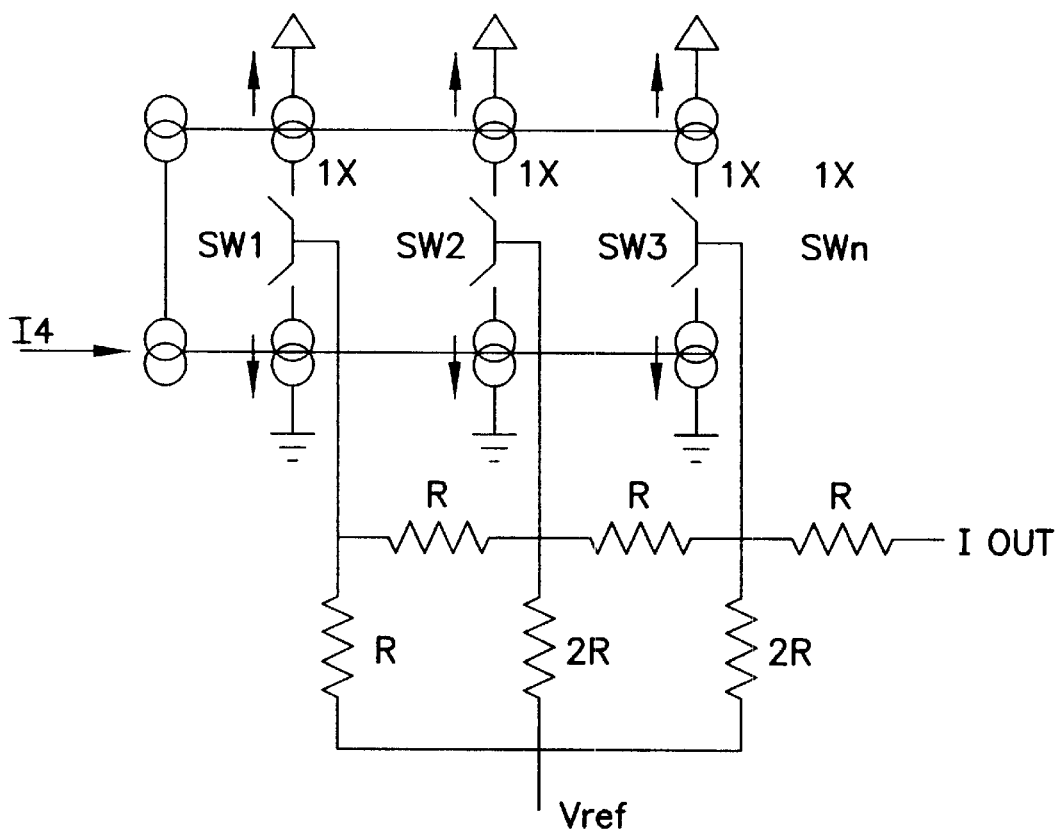
FIG. 5 is an exemplary embodiment of a programmable switching circuit with a known R2R ladder network for use with the circuit shown in FIG. 3.

After the single current at node 36 is obtained, that current is fed into programmable slope switching circuit 40 that is controlled by a programmable memory, which may be an electronically programmable read only memory (EPROM) or other similar device. The circuit 40 allows the current to have either a positive slope or a negative slope. In addition, the circuit 40 can control the magnitude of the current to be some known range of values. The circuits 40 and 42 are operable in a known manner to determine the temperature dependent drift voltage and sensor output current I<sub>OUT</sub> that is provided to the summing means (14) (FIG. 3). An exemplary programmable switching circuit in conjunction with a known R2R ladder network is depicted in FIG. 5 that generates the output current $I_{OUT}$ from the input current I4

While this invention has been described as having an exemplary structure, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A non-linear temperature compensation circuit (10) operable to generate a compensated output signal responsive to changes in operating temperature of the compensation circuit, comprising:
   a temperature dependent current generator circuit (11) for generating a compensated current (I4) substantially proportional to changes in the operating temperature of the circuit from a first temperature;
   a current-based dual-slope drift generator (12) for generating a current proportional to the operating temperature of the circuit; and
   summing means (14) for summing said current (I4) and said compensated current generated by said current-based dual-slope drift generator (12) to generate the compensated output signal.

2. The compensation circuit of claim 1, wherein said summing means includes a R2R ladder network.

3. The compensation circuit of claim 1, wherein said temperature dependent current generator circuit is configured to generate a variable slope bi-directional current.

4. The compensation circuit of claim 1, wherein said temperature dependent current generator circuit includes a sub-circuit for generating said compensated current (I4) having at least two current generators (31, 44) configured to generate corresponding currents (I2, I3).

5. The compensation circuit of claim 4, wherein each of said current generators includes at least one corresponding resistor (R2, R3).

6. The compensation circuit of claim 5, wherein one of said current generators (31) is configured to generate a current (I2) that is independent of changes in temperature, and another of said current generators (44) is configured to generate a current (I3) that is inversely proportional to changes in temperature.

7. The compensation circuit of claim 6, wherein said temperature dependent current generator circuit further includes means for generating an output compensated current (I4) that is zero when said current (I2) is greater than said current (I3), and is non-zero when said current (I2) is less than said current (I3).

8. The compensation circuit of claim 7, wherein said means for generating an output current includes a voltage generator (32) configured to generate a voltage (V) as a function of the sum of said currents (I2, I3).

9. The compensation circuit of claim 8, wherein said temperature dependent current generator circuit includes a current generator (35) that generates a current as a function of said voltage (V).

10. The compensation circuit of claim 9, wherein said current generator (35) is configured to generate a non-zero current when said voltage (V) falls below a pre-determined threshold value.

11. The compensation circuit of claim 10, wherein said current generator (35) is configured to generate said non-zero current in direct proportion to said voltage (V).

12. The compensation circuit of claim 4, wherein said temperature dependent current generator circuit further includes at least one additional sub-circuit operable to generate a different compensated current (I4).

13. The compensation circuit of claim 12, wherein said temperature dependent current generator circuit further includes means for summing (36) said compensated currents from said sub-circuits.

14. A method for compensating the non-linear voltage drift of a sensing circuit that generates a temperature dependent voltage ($V_T$) having a voltage drift that is a function of the operating temperature of the circuit, comprising the steps of:
   generating a slope current (I2) that is proportional to the operating temperature of the sensing circuit;
   generating a first current (I2) proportional to the temperature dependent voltage ($V_T$) and having a magnitude that is independent of temperature;
   generating a second current (I3) proportional to the temperature dependent voltage ($V_T$) and having a magnitude that decreases with increasing temperature;
   generating an output current that is non-zero only when the first current is greater than the second current, the output current having a magnitude that increases with decreasing temperature; and
   summing the output current with the slope current and applying the resultant current to the temperature dependent voltage ($V_T$) to compensate the voltage drift.

15. The method for compensating the non-linear voltage drift of claim 14, wherein:
   the step of generating the first current includes applying the temperature dependent voltage ($V_T$) to a first resistor (R2);
   the step of generating the second current includes applying the temperature dependent voltage ($V_T$) to a second resistor (R3);
   the non-zero output current is generated at a predetermined break point at which the second current exceeds the first current; and
   the method includes the step of selecting the ratio of the first and second resistors (R2, R3) to establish the break point.

16. The method for compensating the non-linear voltage drift of claim 15, further comprising:
   duplicating the steps of generating the first and second currents and generating a non-zero output current at a breakpoint, wherein the duplicated first and second currents, output current and breakpoint are different from the original breakpoint; and
   summing the duplicated output currents and the original output current are summed and the summed output currents are summed with the slope current.

17. A non-linear temperature compensation circuit (10) operable to generate a compensated output signal responsive to changes in operating temperature of the compensation circuit, comprising:
   a temperature dependent current generator circuit (11) for generating a composite compensated current (I4) substantially proportional to changes in the operating temperature of the circuit, said generator circuit including;
      a first sub-circuit operable to generate a non-zero current only at a breakpoint related to a first temperature;

at least one additional sub-circuit operable to generate a non-zero current only at a breakpoint related to at least one additional temperature different from said first temperature; and means for summing the currents generated by said first sub-circuit and said at least one additional sub-circuit to produce said compensated current (I4);

a current-based dual-slope drift generator (12) for generating a current proportional to the operating temperature of the circuit; and summing means (14) for summing said current (I4) and said compensated current generated by said current-based dual-slope drift generator (12) to generate the compensated output signal.

18. The compensation circuit of claim 17, wherein each of said first sub-circuit and said at least one additional sub-circuit is configured to generate a current that increases with decreases in the operating temperature of the circuit.

* * * * *